July 31, 1962   E. M. SMITH   3,047,012
VISCOUS DAMPENER FOR VALVES
Filed April 16, 1959
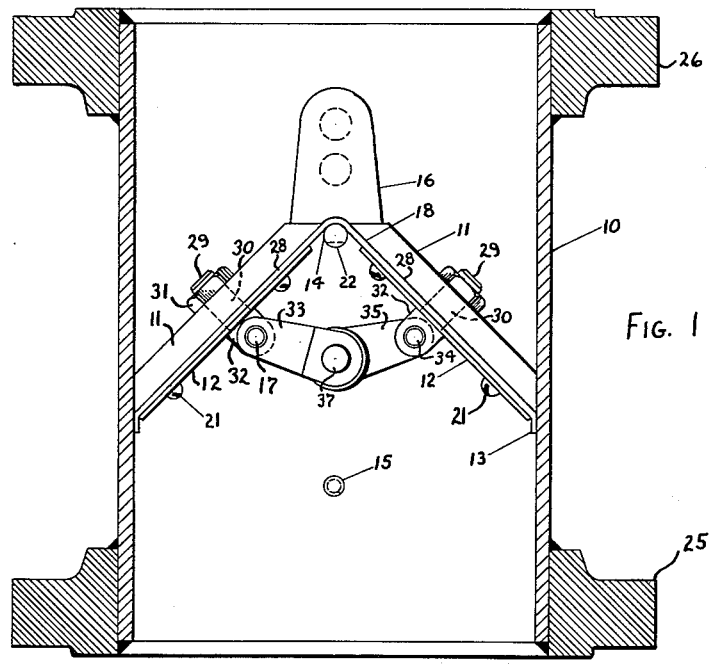
FIG. 1
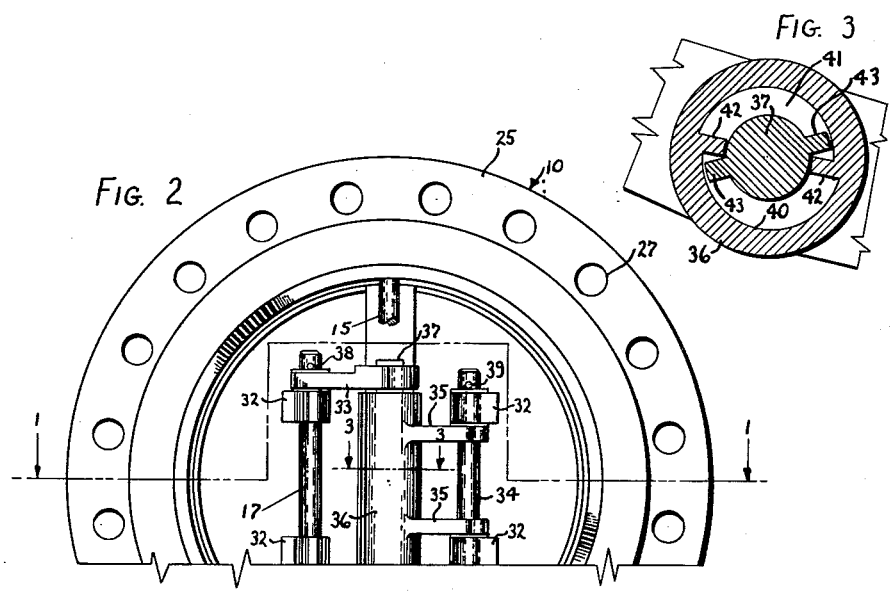
FIG. 2
FIG. 3
INVENTOR.
EDWARD M. SMITH
BY
Charles L. Lovercheck
ATTORNEY

3,047,012
Patented July 31, 1962

3,047,012
VISCOUS DAMPENER FOR VALVES
Edward M. Smith, Mansfield, Ohio, assignor to Techno Corporation, Erie, Pa., a corporation of Pennsylvania
Filed Apr. 16, 1959, Ser. No. 806,850
7 Claims. (Cl. 137—512.15)

This invention relates to valves and, more particularly, to valves having a control device for controlling the rate of closing thereof.

Check valves which are made according to present designs have been troubled with the unsatisfactory results of closing too rapidly. The check valves which are provided with wings which are freely movable are inclined to slam closed rather than closing gently.

It is, accordingly, an object of this invention to overcome the above and other defects in check valves and, more particularly, it is an object of the invention to provide a check valve which is simple in construction, economical to manufacture, and simple and efficient in operation.

Another object of the invention is to provide a valve of the check valve variety having, in combination therewith, a viscous dampener which will control the rate of closing of the valve members thereof.

A further object of the invention is to provide an improved closing device in combination with a check valve.

A still further object of the invention is to provide a check valve closing device wherein the valve is provided with a linkage having an angularity which will control the rate of closing of the valve and a limiting member such that the angular rate or rotation of the pivot point of the linkage varies as the valve closes.

It is a further object of the invention to provide an improved means for regulating the closing rate of the valve members of a check valve.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a longitudinal cross sectional view of a valve taken on line 1—1 of FIG. 2;

FIG. 2 is a top view of the valve; and

FIG. 3 is a view taken on line 3—3 of FIG. 2.

Now with more particular reference to the drawing, a valve is shown having a body 10 with sealing members 18 swingably supported on a hinge clamp 14. The hinge clamp 14 is in the form of a laterally extending rod which extends from one lateral side to the other of the valve body 10 and is fixed therein. The hinge clamp 14 is fixed to a hinge post 16 which is in turn fixed at opposite ends to the valve body 10 to rigidly hold the hinge clamp 14 in position.

The valve body 10 is generally cylindrical in shape and has flanges 25 and 26 welded to opposite sides thereof for attaching the valve in a fluid line. The flanges 25 and 26 have spaced holes 27 for attaching the body 10 in a pipe line.

The valve closure is made up of two valve wings swingably supported on the clamp 14. The wings are made up of the sealing member 18, valve plates 11, and clamp plates 12. The sealing member 18 is an elliptical shaped flexible sheet of material such as rubber, plastic, or the like. The sealing member 18 is clamped at its minor axis to the hinge post 16 by the hinge clamp 14 which has screws 22 passing through the hinge clamp 14 and the sealing member 18 and threaded into the hinge post 16. The sealing members 18 and the clamp plates 12 make up valve closure members.

Ends 28 of the flexible member 18 at each side of the hinge post 16 are each semi-elliptical in shape and ends 13 lie along the inside surface of the body 10. The ends 28 of the sealing members 18 are disposed between the clamp plates 12 and the valve plates 11. The clamp plates 12 and the valve plates 11 are made of rigid material such as steel, stainless steel, or other metal or rigid material. Each end 28 of the sealing members 18 is sandwiched between the clamp plates 12 and held in clamped relation therebetween by screws 21.

Eye bolts 29 are disposed in holes 30 in the valve plates 11, the clamp plates 12, and the sealing members 18 and held in clamped relation thereto by nuts 31. The other ends 32 of the eye bolts 29 have an eye therein which receives pivot pins 17 and 34 which extend through holes in the eyes and, also, holes in links 33 and 35.

A restricting means is provided made up of a hollow member 36 and a shaft 37. The inner ends of the links 35 designated as first links are integrally attached to the hollow member 36 and the hollow member 36 has an internal cavity therein which receives the shaft 37. The outer ends of the shaft 37 are received in bores in the inner ends of the links 33. The outer ends of the shaft 37 are fixed to the inner ends of the links 33. The outer ends of the links 35 are pivoted on the pins 34. The pins 34 are held in place against axial movement by pins 38 and 39.

The shape of the bores in the hollow member 36 is such that the resistance to rotation of the vanes therein will increase as they approach closed position of the valve. This is only one example of the manner in which the movement of the vanes can be regulated by the device disclosed herein. Cavities 40 and 41 must be filled with a viscous liquid. The surfaces of the bores could be so shaped that maximum resistance was encountered at either end of the stroke or they could be so designed that maximum resistance was encountered at an intermediate part of the stroke.

The restraining means is shown for purposes of illustration as having the cylindrical member 36 which has semi-cylindrical cavities 40 and 41 which are eccentric to each other and are offset in the cavity 40 diametrically to the right and the cavity 41 to the left as shown. The hollow cylindrical member 36 has inwardly extending members 42. The shaft 37 has laterally extending vanes 43 which are integrally attached to the shaft 37 and rotate therewith. Therefore, it will be seen that the outer edges of the vanes 43 are in close proximity to the inner peripheries of the cavities 40 and 41 when the valve is in closed position as shown and when the valve is moved to an open position, the links 35 will rotate the shaft 37 relative to the hollow member 36 which will be held and rotated by the links 35.

Therefore, the clearance between the inner periphery of the cavities 40 and 41 and the ends of the vanes 43 will decrease as the shaft 37 and the hollow member 36 are rotated to the position shown, thereby changing resistance to rotation as it moves in one direction and again changing the resistance to movement as the device moves in the other direction. Therefore, the valve sealing members 18 can move freely and there will be little resistance to the movement thereof as they move from one position, for example, the wide open position, toward the closed position shown but as they approach another position, for example, the closed position, the vanes will have less clearance between the inner periphery of the boss and the ends of the vanes and, therefore, the resistance to closing will increase as the valve reaches closed position.

The contour of the inside surfaces of the cavities 40 and 41 could be changed to cause the clearance between the ends of the vanes 42 and 43 to vary at a different rate and, therefore, change the relative resistance to rotation of the shaft 37 and the member 36 to vary at different rates. The rate of rotation is affected by the angularity or relative angular relation of the links 35 at any particular time.

The inside of the hollow member 36 is divided into two parts separated by the inwardly extending vanes 42. The vanes 42 are shown integrally attached to the inside of the hollow member 36. The inner surfaces of the hollow member 36 defining the cavities 40 and 41 each generally define a half cylinder. The said half cylinders defined by these surfaces are offset diametrically from each other. The center of the shaft 37 is, in the illustration shown, offset from the centers of both said half cylinders. Therefore, when the shaft 37 is rotated to the position shown, there is minimum clearance between the outer edges of the vanes 43 and the inner surfaces of the cavities 40 and 41. As the shaft 37 is rotated counterclockwise, the clearance between the vanes and the inside surface increases. Therefore, when the cavities 40 and 41 are filled with a viscous liquid, the liquid will offer less resistance to flow from one side of the vanes to the other as the shaft 37 rotates and the valve members attached to the links 35 will, therefore, move more freely as they open and thereby rotate the shaft 37 counterclockwise as viewed.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a valve and a damping device therefore, said valve having a body member with an inner cylindrical surface, support means in said body member, wing members supported on said support means, said wing members swinging together to open said valve and swinging from each other and into sealing engagement with the inside periphery of said body member to close said valve, said damping device comprising a first arm member pivotally connected to one said wing member, a second arm member pivotally connected to the other said wing member, said first arm member having a hollow cylindrical member supported thereon and disposed generally parallel to said support means and adapted to contain a viscous fluid, said hollow cylindrical member having two half cylinder shaped bores offset diametrically laterally from each other in said hollow cylindrical member, a shaft rotatably supported in said hollow cylindrical member, and vanes attached to said shaft and rotatable therewith in said hollow cylindrical member, said first arm member being connected to said shaft and said second arm member being connected to said cylindrical member, said vanes moving in close proximity to the inside of said bores when said valve is in the one position and moving away from said bores when said valve approaches another position said shaft being so positioned in said hollow cylindrical member that when it rotates toward its closing position, the clearance between said vanes and the inside surface of said hollow cylindrical member gradually decreases and therefore gradually offers a greater resistance to the flow of said viscous fluid and when said shaft rotates oppositely toward its opening position, said clearance between said vanes and said inside surface gradually increases, thereby offering a lessening resistance to the fluid flow, thus permitting said wing members to move more freely.

2. The combination recited in claim 1 wherein two spaced said first arm members and two spaced said second arm members are provided, said first arm members being supported on opposite ends of said shaft and said second arm members being supported in axial spaced relation on said hollow cylindrical member.

3. A valve, said valve comprising a hollow body having an inner surface, spaced wing members supported in said member and swingable about a laterally disposed axis therein, and means to limit the rate of movement of said wing members away from each other, said means applying a greater restriction to movement of said wing members when they are in one position than when they approach another position, said means to limit the rate of movement of said wing members comprising a first link swingably connected to one said wing member, a second link swingably connected to the other said wing member, a damping means connecting the distal ends of said links, said damping means comprising a hollow body having a half cylindrical surface therein having its longitudinal axis disposed generally at right angles to the longitudinal axis of said body, said first link being fixed to said cylindrical surface, a shaft in said cylindrical surface, said second link being attached to said shaft, said body adapted to contain a viscous fluid and a flow path for said fluid from one part of said body to another, damping means on said shaft to reduce the clearance between said means and said shaft, said shaft being so positioned in said hollow member that when it is rotated by said link attached to one said wing member as said wing members move toward closed position, the clearance for flow of fluid in said path from one part thereof to another gradually decreases, thereby offering a greater resistance to the liquid flow therein.

4. In combination, a check valve having a body and a valve closure member for said valve adapted to have a force exerted thereon by fluid therein, a restraining member, said closure member being movable from an open position to a closed position, and a link, said link being connected to said closure member and to said restraining member, a part of said restraining member being connected to a member on said body, the parts of said restraining member being movable relative to each other, said restraining member attached to said link exerting a force on said closure member limiting the rate of movement of said closure member, said closure member having means to vary the force exerted by said closure member by said fluid during travel of said closure member, said means exerting a maximum restraining force on said closure member as it approaches closed position, said valve closure member being supported on a shaft, said restraining member comprising a body having two hemi-cylindrical openings disposed in diametrically offset relation to each other defining a hollow in said body, and a wing member in each said hemi-cylindrical opening, said shaft in said body disposed parallel to the axis of said hemi-cylindrical openings, said wing members being disposed generally radially of each said hemi-cylindrical opening, said wing members being supported on said shaft.

5. A valve comprising a hollow body, a closure member having a first and a second part swingably attached to said hollow body to swing from an open to a closed position, damping means, said damping means comprising a member with a hollow therein attached to said first part of said closure member, a rotatable member rotatably supported in said hollow member and attached to said second part of said closure member and having means thereon to move relative to and spaced from the surface of said hollow member as it rotates in said hollow member, the space between said rotatable member and said hollow member decreasing as said closure member moves from an open to a closed position, said hollow in said hollow member comprising a first and a second cavity, said first and second cavities being divided by said means on said rotatable member, and a liquid in said first and second cavities, said liquid being forced from said first cavity to said second cavity through said space between said means on said rotatable member and said surface of said hollow member when said closure member swings whereby a varying force is exerted on said closure member.

6. The valve recited in claim 5 wherein said surface of said hollow member is generally cylindrical and said rotatable member extends axially of said generally cylindrical surface, and said means on said rotatable member comprises a vane fixed to said rotatable member and extending axially of said generally cylindrical surface.

7. The valve recited in claim 5 wherein said surface on said hollow member comprises two surfaces each generally defining half of a cylinder offset from each other, and said means on said rotatable member comprises two blade members, each extending from said rotatable member generally radially thereof.

References Cited in the file of this patent
UNITED STATES PATENTS

| | | |
|---|---|---|
| 505,238 | Smith | Sept. 19, 1893 |
| 1,438,161 | Zimmerman | Dec. 5, 1922 |
| 1,487,038 | Spencer | Mar. 18, 1924 |
| 1,823,263 | Fabry | Sept. 15, 1931 |